(12) United States Patent
Kokel

(10) Patent No.: US 12,057,873 B2
(45) Date of Patent: Aug. 6, 2024

(54) MAXIMIZING EFFICIENCY OF COMMUNICATION SYSTEMS WITH SELF-INTERFERENCE CANCELLATION SUBSYSTEMS

(71) Applicant: GenXComm, Inc., Austin, TX (US)

(72) Inventor: Samuel Kokel, Austin, TX (US)

(73) Assignee: GenXComm, Inc., Austin, TX (US)

( * ) Notice: Subject to any disclaimer, the term of this patent is extended or adjusted under 35 U.S.C. 154(b) by 45 days.

(21) Appl. No.: 17/674,709

(22) Filed: Feb. 17, 2022

(65) Prior Publication Data

US 2022/0263529 A1    Aug. 18, 2022

Related U.S. Application Data

(60) Provisional application No. 63/150,805, filed on Feb. 18, 2021.

(51) Int. Cl.
*H04B 1/10* (2006.01)
*H04B 1/00* (2006.01)
*H04B 1/525* (2015.01)

(52) U.S. Cl.
CPC .......... *H04B 1/1027* (2013.01); *H04B 1/0046* (2013.01); *H04B 1/1018* (2013.01); *H04B 1/525* (2013.01)

(58) Field of Classification Search
CPC .......... H04B 1/525; H04B 1/10; H04B 15/00; H04B 1/1036; H04B 1/1027; H04B 1/109;
(Continued)

(56) References Cited

U.S. PATENT DOCUMENTS

| | | | |
|---|---|---|---|
| 4,608,569 | A | 8/1986 | Dickey, Jr. et al. |
| 5,377,289 | A | 12/1994 | Johnson |

(Continued)

FOREIGN PATENT DOCUMENTS

| | | |
|---|---|---|
| CN | 101379718 | 3/2009 |
| CN | 104484852 | 4/2015 |

(Continued)

OTHER PUBLICATIONS

Chang et al., "Full-duplex spectrum sensing in cognitive radios using optical self-interference cancellation," 2015 9th International Conference on Sensing Technology (ICST), IEEE, pp. 341-344, Dec. 8, 2015.

(Continued)

*Primary Examiner* — Golam Sorowar
(74) *Attorney, Agent, or Firm* — Brownstein Hyatt Farber Schreck, LLP

(57) ABSTRACT

A wireless communication device can include a transmitter subsystem configured to transmit a transmit signal that, once propagated from the wireless communication device, may be reflected back and received by a receiver subsystem as interference. The wireless communication device can include a self-interference cancellation subsystem configured to generate a cancellation signal to mix with received signals to mitigate self-interference effects. A performance floor for the self-interference cancellation subsystem may be determined based on a phase noise profile of an oscillator of either or both the transmitter subsystem or the receiver subsystem. The performance floor metric can be thereafter used to inform an operation or operational setting of the wireless communication device.

11 Claims, 4 Drawing Sheets

(58) Field of Classification Search
CPC .. H04B 1/0475; H04B 1/0003; H04B 1/0042; H04B 1/401; H04B 1/713; H04B 1/715; H04B 15/02; H04B 2001/0408; H04B 10/2507; H04B 2210/006; H04B 1/123; H04B 17/318; H04B 10/00; H04B 10/07955; H04B 10/2575; H04B 17/336; H04L 5/14; H04L 5/1461; H04L 25/0212; H04L 25/025; H04L 43/16; H04L 25/0204; H04L 27/2647; H04L 25/03006; H04L 25/0224; H04L 25/022; H04L 25/0228; H04L 25/03; H04L 27/2614; H04L 43/026; H04L 25/0328; H04L 27/22; H04L 27/26; H04L 27/2651; H04L 47/29; H04W 28/04; H04W 88/06; H04W 24/00; H04W 28/18; H04W 52/265; H04W 52/346; H04W 72/00; H04W 24/08; H04W 24/02; H04W 72/541; H04W 84/12

See application file for complete search history.

(56) References Cited

U.S. PATENT DOCUMENTS

| | | | |
|---|---|---|---|
| 5,444,864 A | 8/1995 | Smith | |
| 5,578,845 A | 11/1996 | Yoshiyuki et al. | |
| 5,699,176 A | 12/1997 | Cohen | |
| 5,701,371 A | 12/1997 | Ishida | |
| RE35,736 E | 2/1998 | Powell | |
| 5,757,312 A | 5/1998 | Szmurlo | |
| 5,867,293 A | 2/1999 | Kotten | |
| 5,904,546 A | 5/1999 | Wood et al. | |
| 6,359,714 B1 | 3/2002 | Imajo | |
| 6,373,909 B2 | 4/2002 | Lindquist | |
| 6,507,728 B1 | 1/2003 | Watanabe | |
| 6,539,204 B1 | 3/2003 | Marsh | |
| 6,567,648 B1 | 5/2003 | Ahn | |
| 6,567,649 B2 | 5/2003 | Souissi | |
| 6,745,018 B1 | 6/2004 | Zehavi | |
| 6,751,447 B1 | 6/2004 | Jin | |
| 6,760,454 B1 | 7/2004 | Shreve | |
| 6,771,931 B2 | 8/2004 | Waltho | |
| 6,778,319 B2 | 8/2004 | Chavez-Pirson | |
| 6,873,639 B2 | 3/2005 | Zhang | |
| 6,907,093 B2 | 6/2005 | Blount | |
| 6,965,578 B1 * | 11/2005 | Kappes | H04B 3/23 379/406.01 |
| 6,999,639 B2 | 2/2006 | Tsarev | |
| 7,020,396 B2 | 3/2006 | Izadpanah | |
| 7,058,368 B2 | 6/2006 | Nicholls | |
| 7,064,697 B2 | 6/2006 | Taylor et al. | |
| 7,085,497 B2 | 8/2006 | Tiemann | |
| 7,116,484 B2 | 10/2006 | Nemoto | |
| 7,123,676 B2 | 10/2006 | Gebara | |
| 7,130,289 B2 | 10/2006 | Kuan et al. | |
| 7,204,647 B2 | 4/2007 | Ohm | |
| 7,355,993 B2 | 4/2008 | Adkins | |
| 7,366,244 B2 | 4/2008 | Gebara | |
| 7,446,601 B2 | 11/2008 | LeChevalier | |
| 7,496,257 B2 | 2/2009 | Levner | |
| 7,509,054 B2 | 3/2009 | Calabro et al. | |
| 7,566,634 B2 | 7/2009 | Beyne et al. | |
| 7,650,080 B2 | 1/2010 | Yap | |
| 7,660,531 B2 | 2/2010 | Lee | |
| 7,672,643 B2 | 3/2010 | Loh | |
| 7,680,368 B2 | 3/2010 | Welch et al. | |
| 7,711,329 B2 | 5/2010 | Aparin | |
| 7,720,029 B2 | 5/2010 | Orava | |
| 7,729,431 B2 | 6/2010 | Gebara | |
| 7,756,480 B2 | 7/2010 | Loh | |
| 7,778,611 B2 | 8/2010 | Asai | |
| 7,809,047 B2 | 10/2010 | Kummetz | |
| 7,826,808 B2 | 11/2010 | Faulkner | |
| 7,853,195 B2 | 12/2010 | Higgins | |
| 7,869,527 B2 | 1/2011 | Vetter | |
| 7,876,867 B2 | 1/2011 | Filipovic | |
| 7,907,895 B2 | 3/2011 | Shinagawa | |
| 7,917,177 B2 | 3/2011 | Bauman | |
| 8,036,606 B2 | 10/2011 | Kenington | |
| 8,055,235 B1 | 11/2011 | Gupta et al. | |
| 8,078,130 B2 | 12/2011 | Fudge | |
| 8,081,946 B2 | 12/2011 | Fudge | |
| 8,098,779 B2 | 1/2012 | Komninakis et al. | |
| 8,155,605 B2 | 4/2012 | Hwang | |
| 8,170,487 B2 | 5/2012 | Sahota et al. | |
| 8,233,872 B2 | 7/2012 | Nagai | |
| 8,249,540 B1 | 8/2012 | Gupta | |
| 8,270,843 B2 | 9/2012 | Nakamoto | |
| 8,299,555 B2 | 10/2012 | Su et al. | |
| 8,320,504 B2 | 11/2012 | Peng | |
| 8,331,509 B2 | 12/2012 | Wang | |
| 8,351,874 B2 | 1/2013 | Dent | |
| 8,477,871 B2 | 7/2013 | Neumann | |
| 8,521,090 B2 | 8/2013 | Kim | |
| 8,526,903 B2 | 9/2013 | Gudem | |
| 8,565,681 B2 | 10/2013 | Kim | |
| 8,600,200 B1 | 12/2013 | Rakich et al. | |
| 8,618,966 B2 | 12/2013 | Kanter | |
| 8,682,170 B2 | 3/2014 | Prucnal | |
| 8,693,810 B2 | 4/2014 | Suarez et al. | |
| 8,730,786 B2 | 5/2014 | Wang | |
| 8,781,030 B2 | 7/2014 | Peng | |
| 8,785,332 B2 | 7/2014 | Johnson et al. | |
| 8,805,298 B2 | 8/2014 | McCallister | |
| 8,845,854 B2 | 9/2014 | Lei et al. | |
| 8,867,928 B2 | 10/2014 | Piehler | |
| 8,872,583 B2 | 10/2014 | Lee | |
| 8,971,712 B2 | 3/2015 | Fan et al. | |
| 8,977,223 B1 | 3/2015 | Gupta | |
| 9,020,307 B2 | 4/2015 | Ishikawa | |
| 9,077,440 B2 | 7/2015 | Wyville | |
| 9,100,099 B2 | 8/2015 | Loh | |
| 9,106,453 B2 | 8/2015 | Wang | |
| 9,160,386 B2 | 10/2015 | Rimini | |
| 9,178,635 B2 | 11/2015 | Ben-Shlomo | |
| 9,184,902 B2 | 11/2015 | Khojastepour | |
| 9,195,052 B2 | 11/2015 | Long | |
| 9,214,718 B2 | 12/2015 | Mow | |
| 9,224,650 B2 | 12/2015 | Lei et al. | |
| 9,252,857 B2 | 2/2016 | Negus | |
| 9,253,003 B1 | 2/2016 | Harel | |
| 9,257,811 B2 | 2/2016 | Gao | |
| 9,258,052 B2 | 2/2016 | George | |
| 9,268,092 B1 | 2/2016 | Jarecki, Jr. | |
| 9,312,895 B1 | 4/2016 | Gupta | |
| 9,344,125 B2 | 5/2016 | Kpodzo | |
| 9,344,139 B2 | 5/2016 | Sjoland | |
| 9,385,268 B2 | 7/2016 | Minamiru et al. | |
| 9,391,667 B2 | 7/2016 | Sundstrom | |
| 9,438,288 B2 | 9/2016 | Feld | |
| 9,450,623 B2 | 9/2016 | Weissman | |
| 9,490,963 B2 | 11/2016 | Choi | |
| 9,503,134 B2 | 11/2016 | Sadek et al. | |
| 9,520,983 B2 | 12/2016 | Choi et al. | |
| 9,520,985 B2 | 12/2016 | Choi | |
| 9,571,205 B1 | 2/2017 | Suarez | |
| 9,589,812 B2 | 3/2017 | Takahashi et al. | |
| 9,602,149 B1 | 3/2017 | Tanzi | |
| 9,608,718 B2 | 3/2017 | Monsen | |
| 9,651,652 B2 | 5/2017 | Kpodzo et al. | |
| 9,667,404 B2 | 5/2017 | Sjoland | |
| 9,696,492 B1 | 7/2017 | Cox | |
| 9,698,913 B2 | 7/2017 | Foster | |
| 9,703,046 B2 | 7/2017 | Paquet | |
| 9,703,056 B2 | 7/2017 | Neelakantan et al. | |
| 9,712,233 B1 | 7/2017 | Deng | |
| 9,722,713 B2 | 8/2017 | Tanzi | |
| 9,723,612 B2 | 8/2017 | Stapleton | |
| 9,726,821 B2 | 8/2017 | Murray et al. | |
| 9,735,056 B2 | 8/2017 | Takahashi et al. | |
| 9,748,906 B2 | 8/2017 | Stewart | |
| 9,768,852 B2 | 9/2017 | Ling | |

(56) References Cited

U.S. PATENT DOCUMENTS

| | | |
|---|---|---|
| 9,774,364 B2 | 9/2017 | Shih |
| 9,775,123 B2 | 9/2017 | Harel |
| 9,793,943 B2 | 10/2017 | Sjoland |
| 9,793,992 B2 | 10/2017 | Hino |
| 9,807,700 B2 | 10/2017 | Harel |
| 9,831,898 B2 | 11/2017 | Pratt |
| 9,847,258 B2 | 12/2017 | Rohleder et al. |
| 9,871,552 B2 | 1/2018 | Din |
| 9,885,806 B2 | 2/2018 | Steinhardt |
| 9,885,825 B2 | 2/2018 | Kopp |
| 9,887,862 B2 | 2/2018 | Zhou et al. |
| 9,900,044 B2 | 2/2018 | Sjoland |
| 9,923,593 B2 | 3/2018 | Andersson |
| 9,923,708 B2 | 3/2018 | Khandani |
| 9,948,377 B1 | 4/2018 | Kim et al. |
| 9,960,805 B2 | 5/2018 | Wyville |
| 9,960,850 B2 | 5/2018 | Daniel |
| 9,967,014 B1 | 5/2018 | Park et al. |
| 9,973,282 B2 | 5/2018 | Welch |
| 9,997,363 B2 | 6/2018 | Ono et al. |
| 10,009,120 B2 | 6/2018 | Ranson |
| 10,027,465 B2 | 7/2018 | Sjoland |
| 10,031,246 B2 | 7/2018 | Zhou |
| 10,038,471 B2 | 7/2018 | Chang |
| 10,041,028 B2 | 8/2018 | Sim et al. |
| 10,064,217 B2 | 8/2018 | Rajagopal et al. |
| 10,084,506 B2 | 9/2018 | Sjoland |
| 10,110,306 B2 | 10/2018 | Jain et al. |
| 10,177,836 B2 | 1/2019 | Hong |
| 10,187,158 B2 | 1/2019 | Kikuchi |
| 10,191,217 B2 | 1/2019 | Boutami |
| 10,257,746 B2 | 4/2019 | Jain et al. |
| 10,284,367 B1 | 5/2019 | Le Ngoc et al. |
| 10,321,357 B1 | 6/2019 | Jain et al. |
| 10,325,861 B2 | 6/2019 | Miccoli |
| 10,341,028 B2 | 7/2019 | Kanter |
| 10,356,782 B2 | 7/2019 | Negus |
| 10,367,584 B2 | 7/2019 | Rakich |
| 10,418,775 B2 | 9/2019 | Gao |
| 10,439,287 B2 | 10/2019 | Ashrafi |
| 10,491,313 B2 | 11/2019 | Jain |
| 10,656,350 B2 | 5/2020 | Chen et al. |
| 10,663,663 B2 | 5/2020 | Painchaud |
| 10,673,519 B2 | 6/2020 | Hong |
| 10,727,945 B1 | 7/2020 | Nguyen et al. |
| 10,754,091 B1 | 8/2020 | Nagarajan |
| 10,873,877 B2 | 12/2020 | Jain et al. |
| 11,032,005 B2 | 6/2021 | Vishwanath et al. |
| 11,032,737 B2 | 6/2021 | Jain et al. |
| 11,159,498 B1 | 10/2021 | Mattis et al. |
| 11,215,755 B2 | 1/2022 | Liu et al. |
| 11,330,591 B2 | 5/2022 | Raghothaman et al. |
| 11,469,821 B2 | 11/2022 | Jain et al. |
| 2003/0161637 A1 | 8/2003 | Yamamoto |
| 2004/0151238 A1 | 8/2004 | Masenten |
| 2004/0264610 A1 | 12/2004 | Marro |
| 2011/0065408 A1 | 3/2011 | Kenington |
| 2011/0065409 A1 | 3/2011 | Kenington |
| 2011/0134810 A1 | 6/2011 | Yamamoto |
| 2013/0003787 A1* | 1/2013 | Anda ............... H04B 1/7163 375/219 |
| 2013/0295980 A1 | 11/2013 | Reuven |
| 2014/0169236 A1 | 6/2014 | Choi |
| 2014/0177660 A1 | 6/2014 | Welford |
| 2016/0103341 A1 | 4/2016 | Long |
| 2017/0176780 A1 | 6/2017 | Levy et al. |
| 2018/0006795 A1 | 1/2018 | Raaf |
| 2018/0248627 A1 | 8/2018 | Daniel |
| 2019/0198999 A1 | 6/2019 | Ashrafi |
| 2020/0022091 A1* | 1/2020 | Jang ............... H04W 52/243 |
| 2020/0304253 A1 | 9/2020 | Choi et al. |
| 2020/0305159 A1 | 9/2020 | Raghothaman et al. |
| 2020/0313716 A1* | 10/2020 | Bhat ............... H04B 1/123 |
| 2021/0036779 A1 | 2/2021 | Nguyen et al. |
| 2021/0126669 A1 | 4/2021 | Roberts et al. |
| 2021/0153073 A1 | 5/2021 | Hain et al. |
| 2021/0297156 A1 | 9/2021 | Jain et al. |
| 2021/0336050 A1 | 10/2021 | Mattis et al. |
| 2022/0043211 A1 | 2/2022 | Mattis et al. |

FOREIGN PATENT DOCUMENTS

| | | |
|---|---|---|
| EP | 3561561 | 10/2019 |
| GB | 2139374 | 11/1984 |
| JP | 2002214461 | 7/2002 |
| JP | 2004048200 | 2/2004 |
| JP | 2006301415 | 11/2006 |
| JP | A 2011120120 | 6/2011 |
| JP | A 2013110510 | 6/2013 |
| RU | 2474056 | 1/2013 |
| WO | WO 06/072086 | 7/2006 |
| WO | WO 07/092767 | 8/2007 |
| WO | WO 08/036356 | 3/2008 |
| WO | WO 12/112357 | 8/2012 |
| WO | WO 16/118079 | 7/2016 |

OTHER PUBLICATIONS

IBM, "Silicon Nanophotonic Packaging," https://researcher.watson.ibm.com/researcher/view_group_subpage.php?id=5522, Jul. 2016.

Kwak, MyoungJun, "The Impact of Loop Filter in Phase Locked Loop," Bachelor's Thesis Metropolia University of Applied Sciences, Feb. 19, 2019, 50 pages.

Lecture 150—Phase Noise-1 (Jun. 20, 2003), P.E. Allen 2003, 2 pages.

Li et al., "Multimode silicon photonics," Nanophotonics, vol. 8, No. 2, pp. 227-247, May 16, 2019.

Mokhtari-Koushyar et al., "Nonlinear Distortions Induced by Coherent Combinations in Microwave Photonic Links," 2019 IEEE, Global Communications Conference, Dec. 9-13, 2019, 6 pages.

Mokhtari-Koushyar et al., "Laser Diode Chirp Requirements in Wideband Analog Photonic Signal Processing," 2020 IEEE, Optical fiber Communications Conference and Exhibition, Mar. 8-12, 2020, 3 pages.

Mothe et al., "Multichannel Microwave Photonics Signals Summation Device," IEEE *Photonics Technology Letters*, vol. 3, No. 3, pp. 140-142, Feb. 1, 2011.

Skyworks AN279, "Estimating Period Jitter from Phase Noise," Skyworks Solutions, Inc., Sep. 21, 2021, 8 pages.

Tang et al., "System limitations due to channel cross-coupling in a highly parallel polymer-based single-mode channel waveguide array," Advances in Resistive Technology and Processing XVI, vol. 2042, 12 pages, Aug. 16, 1993.

Tartaret-Josniére et al., "Microwave Photonics Summation Device with up to 19 Input Signals in K and Ku Bands," *Journal of Lightwave Technology*, vol. 34, No. 20, pp. 4715-4721, Oct. 15, 2016.

Velha et al., "Simultaneous data transmissions on engineered closely packed silicon-on-insulator waveguide arrays," 19th International Conference on Transparent Optical Networks (ICTON), IEEE, pp. 1-4, Jul. 2, 2017.

Yoo et al., "Heterogeneous 2D/3D photonic integrated microsystems," *Microsystems & Nanoengineering*, 2, 16030, Aug. 2016.

Quan et al., "A Novel Phase Noise Mitigation Method for Full-Duplex Transceivers" 2019 11th International Conference on Wireless Communications and Signal Processing (WCSP) IEEE Oct. 23, 2019 pp. 1-6.

Syrjälä et al., "Analysis of Oscillator Phase-Noise Effects on Self-Interference Cancellation in Full-Duplex OFDM Radio Transceivers" IEEE Transactions on Wireless Communications vol. 13, No. 6, pp. 2977-2990 Jun. 6, 2014.

Sahai et al., "Understanding the Impact of Phase Noise on Active Cancellation in Wireless Full-Duplex" Asilomar Conference on Signals, Systems and Computers Conference Record, IEEE Computer Society pp. 29-33 Nov. 12, 2012.

Invitation to Pay Additional Fees and, where applicable, Protest Fee for International Patent Application No. PCT/US2022/016873 dated Jun. 7, 2022.

(56) References Cited

OTHER PUBLICATIONS

International Search Report and Written Opinion for International Patent Application No. PCT/US2022/016873 dated Jul. 29, 2022.
Amiri, I.S. et al., "W-Band OFDM Transmission for Radio-Over-Fiber Link Using Solitonic Millimeter Wave Generated by MRR" (Aug. 2014) IEEE Journal of Quantum Electronics 50(8): 622-628.
Amiri, I.S. et al., "2X2 MIMO-OFDM-RoF generation and transmission of double V-Band signals using a microring resonator system" (Dec. 12, 2015) Optical and Quantum Electronics, Springer US, NY vol. 48:1 1-15.
Blumenthal, D.J., "Photonic integration for UV to IR applications" (2020) APL Photonics 5: 020903 (12 pages).
Huffman, T.A. et al., "Integrated Resonators in an Ultralow Loss Si3N4/SiO2 Platform for Multifunction Applications" (Jul./Aug. 2018) IEEE Journal of Selected Topics in Quantum Electronics vol. 24, No. 4 (9 pages).
Zhu, D. et al., "Integrated photonics on thin-film lithium niobate" (Feb. 23, 2021) arxiv.org, Cornell University Library, 201 Olin Library Cornell University Ithaca, NY 14853 (94 pages).

\* cited by examiner

MAXIMIZING EFFICIENCY OF COMMUNICATION SYSTEMS WITH SELF-INTERFERENCE CANCELLATION SUBSYSTEMS

CROSS-REFERENCE TO RELATED APPLICATION(S)

This application is a nonprovisional of, and claims the benefit under 35 U.S.C. 119(e) to U.S. Provisional Patent Application No. 63/150,805, filed Feb. 18, 2021, and entitled "Self-Interference Cancellation Phase Noise Limit Analysis Method," the contents of which are incorporated herein by reference as if fully disclosed herein.

TECHNICAL FIELD

Embodiments described herein relate to communication systems, and in particular, to communication systems that incorporate a self-interference cancellation subsystem.

BACKGROUND

An electronic device can include a transmitter and a receiver. In many cases, signals output from the transmitter are undesirably incident upon the receiver, interfering with operation of the receiver. This interference is referred to as "self-interference."

Some conventional electronic devices incorporate a self-interference cancellation subsystem configured to minimize negative effects of self-interference. However, because communication systems are operated in many different environments, each having a different transfer function, self-interference cancellation systems are often either undesirably expensive to manufacture and/or operate (and, typically, consume significant power and occupy significant physical volume) or are under-performing (and do not provide sufficient self-interference cancellation for all multipath effects of a particular operating environment).

SUMMARY

Embodiments described herein take the form of a self-interference cancellation system. The self-interference cancellation system, in many embodiments, includes a primary oscillator and a power controller that in turn includes a processor and a memory. The processor is configured to access the memory to retrieve at least one executable asset therefrom, and to operate with the memory to instantiate an instance of software configured to select and/or set at least one operational parameter of the self-interference cancellation system based on a phase noise profile of the primary oscillator.

In some implementations, the instance of software can be configured to select and/or set the at least one operational parameter of the self-interference cancellation system based on phase noise exhibited by the primary oscillator at an operating frequency of a transmitter associated with the self-interference cancellation system.

In some embodiments, the at least one operational parameter is a first operational parameter and the instance of software may be configured to select and/or select a second operational parameter, the second operational parameter of the primary oscillator. In these examples, the second operational parameter may be a power consumption limit of the primary oscillator.

Further embodiments described herein relate to a method of operating a communications device including operations such as: determining a phase noise profile of at least one oscillator of the communications device; determining a self-interference cancellation floor based on the phase noise profile; based on the self-interference cancellation floor, determining a maximum transmit power of a transmitter of the communications device based at least in part on the self-interference cancellation floor; and limiting the transmit power of the transmitter to the maximum transmit power.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
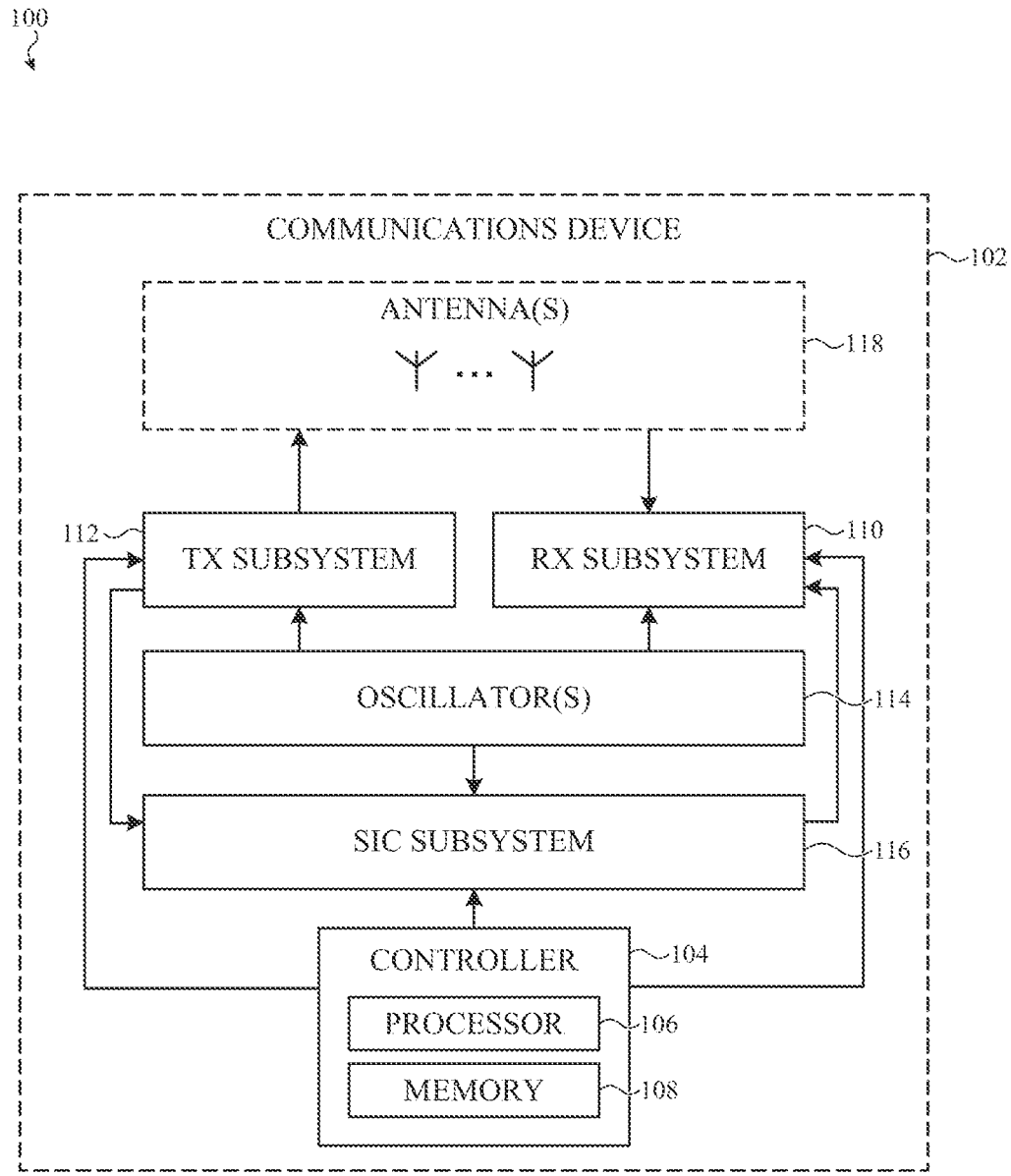
FIG. 1 depicts a communications device, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for controlling one or more operations of a communications device, such as an electronic radio, in order to, in some examples, optimize power use efficiency, transmission symbol rate, and/or receiver signal-to-noise ratios. More specifically, many embodiments described herein relate to systems and methods for operating (1) a self-interference cancellation subsystem, (2) a transmitter subsystem, and/or (3) a receiver subsystem of a wireless communication device based on a phase noise profile of an oscillator (e.g., sampling oscillator, modulating oscillator, and so on) of that wireless communication device. Some embodiments recommend, select, and/or selectively enable one or more oscillators for a particular wireless communication device deployed in a particular environment based on phase noise profile(s) of those oscillators.

Initially, although many embodiments described herein relate to wireless communication systems and devices, it may be appreciated that the systems and methods described herein can be likewise applied to wired communication systems as well. In further examples, embodiments described herein can be leveraged by sensing systems such as radar systems. In other cases, embodiments described herein can be leveraged by jamming systems. For simplicity of description, the embodiments that follow reference wireless implementations, but it may be appreciated that this example use case is not limiting.

A wireless communication system as described herein, generally and broadly, can include a transmitter subsystem configured to transmit a "transmitted signal," a receiver subsystem to receive a "received signal," and a self-interference cancellation subsystem to generate a "cancellation signal" from the transmitted signal such that, if the cancellation signal is combined with the receive signal (in the digital domain, the analog domain, at baseband, and/or in the RF/microwave/carrier domain), the cancellation signal destructively interferes with the receive signal to attenuate, or eliminate, effects that the transmitted signal may have on the receive signal.

More simply, the cancellation signal of such embodiments reduces interference by the transmitter subsystem with the receiver subsystem so that the transmitter subsystem and receiver subsystem can operate in some examples simultaneously, with the same antenna resources, and/or within overlapping bands.

As may be appreciated by a person of skill in the art, generating a cancellation signal that eliminates all interference introduced by a transmitter subsystem to a receiver subsystem is exceptionally difficult, if not impossible, in most circumstances. Real-world implementations of self-interference cancellation systems and subsystems have many limitations, most of which are constrained by engineering complexity, budgets, power consumption, and/or intended use or intended deployment (e.g., location, stationary, mobile, and so on) for a particular wireless communication device.

For example, many self-interference cancellation systems are designed to include one or more delay elements that precisely phase-shift (and/or invert, amplify, or attenuate) a transmitted signal to cancel an echo of that transmitted signal that may be received by a receiver subsystem of the same device, after having been transmitted by the transmitter subsystem. As may be appreciated by a person of skill in the art, each individual delay element provides a component of cancellation for an echo of the transmitted signal. As may also be appreciated, a real-world deployment of a wireless communication device may encounter numerous echoes of a transmitted signal, each echo phase-shifted by a different amount (e.g., reflecting from surfaces or objects at different distances). As a result, many conventional wireless communication devices incorporating a self-interference cancellation subsystem are typically manufactured with a fixed number of delay elements, selected based on budget and/or physical space requirements.

Unfortunately, as known to a person of skill in the art, different deployments experience different environmental effects (e.g., different echo). As a result, a wireless communication device manufactured with a fixed number of delay elements may be overengineered in some deployments and underperforming in other environments. For example, a wireless communication device deployed atop a cell site constructed at a mountaintop may experience significantly less echoing of a transmitted signal than if that same wireless communication device were deployed in a city center. In the first deployment, a significant number of delay elements incorporated into the wireless communication device may be unused. Similarly, in the second deployment, the number of delay elements may be insufficient to cancel all echoes received by the wireless communication device. In a more particular phrasing, the first deployment may be overengineered and unnecessarily expensive for the particular deployment, whereas the second deployment may be underperforming.

The foregoing is merely one example challenge that may be encountered when designing a wireless communication device. Another factor bounding self-interference cancellation performance is based on the quality of oscillator(s) used in a particular wireless communication device. For example, a sampling oscillator used in a receiver subsystem and a modulating oscillator used in a transmitter subsystem. In some cases, a self-interference cancellation subsystem may tap and/or otherwise leverage either or both a sampling oscillator or a modulating (or other oscillators, such as an oscillator specific to a self-interference cancellation subsystem) oscillator in order to generate a cancellation signal. As known to a person of skill in the art, tapping oscillators and distributing them within the interference cancellation subsystem, as well as transmitter and receiver subsystems, allows in-phase or substantially in-phase operation of components across the system there-by improving self-interference cancellation performance.

However, as a result of using these oscillators as input to perform its function, the self-interference cancellation subsystem is performance-limited by the quality of those oscillators. More specifically, the more phase noise exhibited these oscillators, the less accurately or precisely the self-interference cancellation subsystem can perform its function. Phase noise may also accumulate over time, thereby requiring/causing the self-interference cancellation subsystem to regularly execute computationally expensive synchronization operations and/or to include power-consuming and volume-occupying phase lock loops and/or feedback loops to mitigate negative effects of oscillator phase noise.

To account for these and other noise sources that can degrade performance of a self-interference cancellation subsystem, embodiments described herein can leverage an accumulated phase noise model to effectively predict a self-interference cancellation limit attributable to oscillator phase noise impairments for a given self-interference cancellation subsystem operating in a given environment.

For example, expected phase noise $\psi_C^2(\tau)$ accumulated at band center C for orthogonal frequency division multiplexed (OFDM) signals, with even power distribution across bandwidth B for an arbitrary delay period $\tau$ can be represented by Equation 1:

$$\psi_C^2(\tau) = \int_0^{B/2} 4\sin^2(\pi f \tau) 2 \cdot \zeta(f) df \qquad \text{Equation 1}$$

In this equation, $\zeta(f)$ represents single-sided phase noise of a particular oscillator, as a function of frequency. By integrating over an interval from zero to half the bandwidth B, accumulate phase noise as a function of r can be determined.

Similarly, accumulated phase noise at band edge $\psi_E^2(\tau)$ (for spectrally square signals), over a delay period $\tau$, and signal bandwidth B can be represented by Equation 2:

$$\psi_E^2(\tau) = \int_0^B 4\sin^2(\pi f \tau) \cdot \zeta(f) df \quad \text{Equation 2}$$

As with the preceding model, in this equation, $\zeta(f)$ represents single-sided phase noise of a particular oscillator, as a function of frequency. By integrating over an interval from zero to bandwidth B, accumulate phase noise at the band edge, as a function of $\tau$ can be determined.

Generally and broadly, these equations/models can be used to determine and/or predict the aggregated effect of phase noise over a particular time period.

In addition, as known to a person of skill in the art, a particular deployment environment can be represented by a transfer function. For example, an installation/deployment of a particular wireless communication system can be modeled as:

$$h_n = \frac{1}{N} \cdot \sum_{k=0}^{N-1} H_k e^{-\frac{i2\pi k n}{N}} \quad \text{Equation 3}$$

In this example, $H_K$ is a sequence of complex numbers that represents the frequency response (measured, known, or otherwise determined) of a particular self-interference channel (e.g., a frequency response of a particular environment in which a wireless communication device is deployed). To determine a time-domain impulse response of this self-interference channel, an inverse DFT operation can be performed, such as shown in Equation 3. More specifically, $h_n$ represents the time-domain impulse response of a particular deployment of a particular wireless communication device.

In view of the foregoing, a noise cancellation floor (e.g., best case scenario for self-interference cancellation) can be determined as the sum (from n=0 to N−1) of the impulse time-domain response, power weighted by the accumulated phase noise for each respective time delay. This quantity is thereafter normalized by dividing by the sum (from n=0 to N−1) of the power of the self-interference channel itself. In particular, the self-interference cancellation floor can be modeled as:

$$\psi_{SIC}^2 = \frac{\sum_n \psi_{(C/E)}^2(n \cdot \tau) \cdot |h_n|^2}{\sum_n |h_n|^2} \quad \text{Equation 4}$$

In a more simple, non-limiting phrasing, Equation 4 relates particular time delays (e.g., how long an echo in the self-interference channel has to complete a round trip) to the effect that the accumulated phase noise at that delay, for a particular oscillator, in a particular deployment may have on overall self-interference cancellation performance. To phrase another way, the longer a particular echo takes to return to interfere with a receiver subsystem, the greater overall effect accumulated phase noise of oscillators operated in the wireless communication device will have on any attempts to cancel that long-delayed echo. In this manner, by leveraging a model such as presented in Equation 4, embodiments described herein can quickly and easily determine how much self-interference cancellation is possible, given certain oscillators in a certain environment.

This foregoing information/calculation can server a number of important benefits in both design and deployment of wireless communication devices. For example, analysis performed by leveraging Equation 4 and similar relationships can determine what quality of oscillator may be required for a particular deployment.

For example, if a particular wireless communication device is to be deployed in an open field, it may be possible to select a lower-quality and/or lower power sampling oscillator and/or modulation oscillator, thereby saving both design budget and lifetime power consumption of the wireless communication device.

Similarly, if a particular wireless communication device is to be deployed in an environment with a high number of echoes, all within a particular threshold delay (e.g., many near-device reflection sources, few far-device reflection sources), a high-quality oscillator may be required.

In some cases, a wireless communication device can include multiple oscillators that may have different power consumption profiles. For example, a high quality oscillator with low phase noise may require substantially more power to operate than a lower quality oscillator with higher phase noise. In some operational environments, a system as described herein can be configured to leverage a model based on equation 4 as one example, to select which oscillator to use at a particular time. For example, in a mobile wireless communication device, different environments may warrant more or less self-interference cancellation. In such examples, a high-power, high-quality oscillator may be used if and only if required. In all other cases, lower power oscillators may be used.

In some cases, a higher power/quality oscillator may be selected to transmit and/or receive information of particular priority, such as for emergency communications. In other cases, lower-priority communications may be transmitted and received by leveraging less self-interference cancellation and lower-quality oscillators.

It may be appreciated that the foregoing examples are not exhaustive; relating self-interference cancellation capability to both maximum echo delay and to a particular phase noise profile of a particular oscillator may be used for a number of purposes.

For example, in some cases, phase noise profiles of each oscillator used by a particular wireless communication device can be used to calculate predicted floors for noise cancellation for the wireless communication device. This floor of noise cancellation can thereafter be used to determine a maximum transmit power and/or maximum symbol rate expected for the wireless communication device, for either or both the transmitter subsystem or the receiver subsystem. This prediction and/or bounding can be updated in the field (e.g., based on impulse responses of new deployment environments), or may be set at manufacturing time. As may be appreciated, by setting the maximum symbol rate and/or maximum transmit power in this manner, power consumption of the wireless communication device can be optimized.

In some cases, phase noise profile functions of frequency may change based on environmental conditions and/or may be informed by an environmental condition. For example, a particular oscillator may exhibit a different phase noise profile $\zeta(f)$ in different temperatures. In such examples, one or more sensor inputs can be leveraged to select an appropriate phase noise profile $\zeta(f)$ in order to perform the self-interference cancellation floor calculation/prediction discussed above.

In other cases, a noise profile ζ(f) of a particular oscillator may be considered a substantially fixed function. In such examples, band center and band edge accumulated phase noise at different delays can be precalculated and stored in a lookup table. In these embodiments, once an impulse response of a particular deployment is determined, the look-up tables can be leveraged to quickly and efficiently calculate and/or determine a floor of self-interference cancellation that may be possible for a given deployment of a given wireless communication device having particular oscillators.

In view of the foregoing, it may be appreciated that generally and broadly a wireless communication device can leverage phase noise profiles of one or more internal oscillators to predict a performance floor for self-interference cancellation operations. This prediction can be leveraged to suggest or select different oscillators of different quality, to set maximum or minimum transmit power, symbol rate, and so on, and/or to inform any other suitable operation or operational mode or operational parameter of the wireless communication device.

As a result of these embodiments, power-efficient operation of the wireless communication device can be ensured. More specifically, no superfluous or unproductive processor cycles may be required to perform unnecessary self-interference cancellation operations, no power may be consumed unnecessarily by higher-than-necessary-quality oscillators, and/or no power may be consumed attempting to cancel one or more echoes that cannot be canceled effectively or efficiently due to accumulated phase noise of an internal oscillator.

These foregoing and other embodiments are discussed below with reference to FIGS. 1-4. However, those skilled in the art will readily appreciate that the detailed description given herein with respect to these figures is for explanation only and should not be construed as limiting.

FIG. 1 depicts a schematic diagram 100 of a wireless communication device 102. The wireless communication device 102 can be any suitable wireless communication device, and/or may be included in any suitable electronic device including both stationary devices and mobile devices. For example, the wireless communication device 102 may be and/or may be incorporated within a cellular access point, a wi-fi access point, a cellular phone, a laptop computer, a desktop computer, a point-to-point wireless link, a microwave link, a microwave communication system, a cellular communication system, a radar system, a jamming system, telemetry systems, and so on. These examples are not exhaustive.

The wireless communication device 102 includes a controller 104 that in turn includes a processor 106 and a memory 108.

The processor 106 can be any suitable processor or processing device. As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, the memory 108 can be any suitable memory or data storage device. As described herein, the term "memory" refers to any software and/or hardware-implemented data storage device or circuit physically and/or structurally configured to store, as examples, binary data, databases, or object data.

In many constructions, the processor 106 can be operably intercoupled with the memory 108 and can be configured to load from the memory 108 at least one executable asset (e.g., binaries, executable files, executable code, assembly/machine code, and so on). Upon loading the executable asset—and/or other assets or instructions—into the memory 108, an instance of software may be instantiated. The instance of software may be referred to herein as a firmware application, a client application, or more generally as a controller software instance.

The controller software instance, instantiated by cooperation of the processor 106 and the memory 108 can be configured to perform and/or coordinate one or more operations of the controller 104 or, more generally, the wireless communication device 102.

For example, as with embodiments described above, the controller software instance can be configured to access one or more phase noise profiles associated with one or more oscillators used by one or more subsystems of the wireless communication device 102. For example, the wireless communication device 102 can include a receiver subsystem 110 and a transmitter subsystem 112.

The transmitter subsystem 112 can be configured to receive, as input, a baseband signal from the controller 104 or, in some cases, from the controller software instance. The transmitter subsystem 112 can be configured to leverage an oscillator, among a set of oscillators 114, to modulate the baseband signal up to a carrier frequency suitable for wireless transmission to a remote receiver device. The transmitter subsystem 112 can be configured to implement any suitable encoding, conform to any suitable protocol (e.g., 5G NR, Wi-Fi, Bluetooth, microwave link, satellite links, and so on), and/or may be configured to operate at any suitable frequency or set of frequencies. For example, the transmitter subsystem 112 may be configured to transmit in the RF domain, the microwave domain, the mm wave domain, or any other suitable wireless domain.

Similar to the transmitter subsystem 112, the receiver subsystem 110 can be configured to receive a signal from a remote source. Also as with the transmitter subsystem 112, the receiver subsystem 110 can be configured to leverage an oscillator, among the set of oscillators 114, to sample and/or shift to baseband, the received signal. Thereafter, the received signal can be provided for further processing and/or error correction to the controller software instance and/or another component of the wireless communication device 102.

As with the transmitter subsystem 112, the receiver subsystem 110 can likewise be configured to implement any suitable encoding, conform to any suitable protocol (e.g., 5G NR, Wi-Fi, Bluetooth, microwave link, satellite links, and so on), and/or may be configured to operate at any suitable frequency or set of frequencies. For example, the receiver subsystem 110 may be configured to receive in the RF domain, the microwave domain, the mm wave domain, or any other suitable wireless domain. In many cases, the receiver subsystem 110 is configured to operate in a band that overlaps with the transmitter subsystem 112.

In some cases, the wireless communication device 102 can be configured to operate in full duplex mode in which the receiver subsystem 110 is configured to receive one or more signals at the same time the transmitter subsystem 112 is transmitting a signal. In other cases, time multiplexing may be used to share bandwidth resources.

The wireless communication device 102 can further include a self-interference cancellation subsystem 116 that is configured to receive input from the transmitter subsystem 112 to generate one or more cancellation signals that in turn can be provided as input to the receiver subsystem 110. The receiver subsystem 110 can combine the cancellation signals with one or more signal received by the receiver subsystem 110 in order to destructively interfere with reflections of signals transmitted by the transmitter subsystem 112 that echo back to the receiver subsystem 112. In this manner, a transmitted signal generated by the transmitter subsystem 112 and provided via a feed line to one or more antennas 118 can be used to inform generation of one or more cancellation signals (e.g., delayed, attenuated, distorted, inverted, or otherwise modified versions of the transmitted signal) that in turn can be combined with a received signal received at the one or more antennas 118, and conductively coupled into the receiver subsystem 110. The cancellation signals can destructively interfere with echoes of the transmitted signal, thereby reducing self-interference effects.

It may be appreciated that the self-interference cancellation subsystem 116 can operate in a number of different domains. For example, in some embodiments, the self-interference cancellation subsystem 116 can generate an RF-domain cancellation signal that is combined with a receive signal prior to sampling or other demodulation. In other cases, the self-interference cancellation subsystem 116 can be configured to generate a cancellation signal in the digital domain, cancelling interference at baseband. In yet other examples, the self-interference cancellation subsystem 116 can be configured to generate an interference cancellation signal at an intermediate frequency between a carrier frequency and baseband. These examples are not exhaustive; it may be appreciated by a person of skill in the art that self-interference cancellation operations can be performed in a number of different ways, leveraging a number of suitable architectures and techniques.

In many cases, however, the self-interference cancellation subsystem 116 may receive input from an oscillator of the set of oscillators 114, which may include a sampling oscillator used by the receiver subsystem 110 and/or a modulating oscillator used by the transmitter subsystem 112.

As noted above, the quality of these oscillators may define and/or contribute to defining one or more performance limits of the self-interference cancellation subsystem 116. For example, in some embodiments, the controller 104 or in particular the controller software instance can be configured to access the memory 108 to obtain a phase noise profile associated with a particular oscillator of the set of oscillators 114.

The phase noise profile can be used, such as described above in reference to Equation 4, to select a particular oscillator among the set of oscillators 114. For example, the controller software instance may determine that in certain deployments, a high quality/high power oscillator may not be required. In such examples, the self-interference cancellation subsystem 116 and/or the transmitter subsystem 112 and/or the receiver subsystem 110 may be configured to use a lower-quality/lower-power oscillator from the set of oscillators 114. In other cases, the controller software instance may determine that in a particular deployment, a high quality oscillator may be required to cancel echoes from far away surfaces or surface (e.g., high r).

In yet other embodiments, the wireless communication device 102 can be modified or designed based on a phase noise profile of a particular oscillator. For example, if an intended deployment can be predicted to require a high quantity of self-interference cancellation (e.g., a high number of echoes of the transmitted signal are expected or predictable), then the wireless communication device 102 can be furnished with an oscillator having a phase noise profile that enables at least the required floor of self-interference cancellation. As a result of these embodiments, a wireless communication device such as the wireless communication device 102 can be factory configured to include only those components that are required for a particular deployment or particular communications use case.

In yet other examples, phase noise profiles and/or the self-interference cancellation performance floors these profiles can be used to determine can be used to set one or more operational parameters of the wireless communication device 102 itself. For example, as may be appreciated, as transmit power is increased, self-interference cancellation becomes more challenging. In such examples, a maximum transmit power may be calculated based on a floor of self-interference cancellation possible given a particular set of oscillators incorporated into a particular wireless communication device 102. More generally, in some embodiments, transmit power may be limited to a value that ensures a sufficient amount of self-interference cancellation is possible to maintain suitable operation of the receiver subsystem.

In yet other examples, other optional parameters of the wireless communication device 102 can be set and/or selected and/or informed by a phase noise profile of a given oscillator or, in other cases, a self-interference performance metric calculated based on a particular phase noise profile.

For example, in some cases, low power operation of the wireless communication device 102 may be a higher priority than overall transmitted or received symbol rates. In such cases, a controller or instance of software executed by the controller can leverage a phase noise profile of a modulating oscillator to calculate, such as by leveraging Equations 1-4, a floor of possible self-interference cancellation. In this example, a low-power/lower-quality oscillator may be selected based on a balance between an implementation-acceptable symbol rate and/or signal-to-noise ratio(s) and self-interference cancellation performance.

In other cases, the wireless communication device 102 may change an operation of the self-interference cancellation subsystem 116 based on a phase noise profile of a particular oscillator given a particular frequency output by that oscillator. For example, in some cases, one or more of the oscillators of the set of oscillators 114 may be tunable oscillators that exhibit different phase noise profiles or characteristics at different frequencies. In these examples, the self-interference cancellation subsystem 116 can be configured to apply different types/domains of self-interference cancellation based on different phase noise profiles. For example, in some frequency bands of operation, the self-interference cancellation subsystem 116 may provide digital domain self-interference cancellation and no RF domain self-interference cancellation. In the same example, in other frequency bands of operation, the self-interference cancellation subsystem 116 may provide no digital domain self-interference cancellation and/or no baseband domain self-interference cancellation, relying exclusively on RF domain or microwave domain self-interference cancellation. More broadly, it may be appreciated that self-interference techniques can be applied in different situations depending upon phase noise profiles of available or selectable oscillators.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
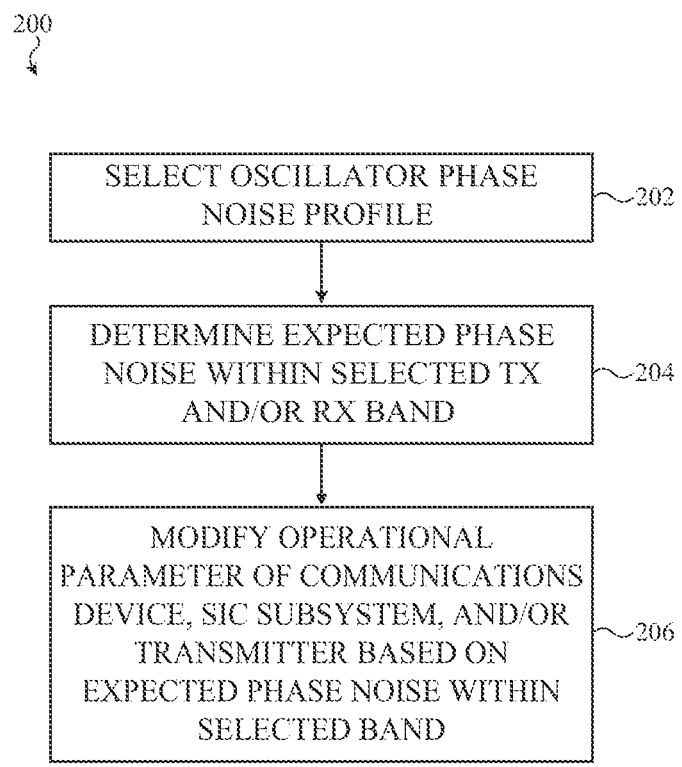
FIG. 2 is a flowchart depicting example operations of a method of operating a communications device incorporating a self-interference cancellation subsystem, such as described herein.

FIG. 2 is a flowchart depicting example operations of a method of operating a communications device incorporating a self-interference cancellation subsystem, such as described herein. The method 200 can be performed by any suitable virtual or physical software or hardware or combination thereof, such as and including a controller as described above.

For example, a controller as described in reference to FIG. 1 may be configured to leverage cooperation of a processor and a memory to instantiate an instance of software that is, in turn, configured to execute one or more control operations against a transmitter subsystem, receiver subsystem, self-interference cancellation subsystem, and so on of a particular wireless communication device.

The method 200 includes operation 202 at which a particular phase noise profile, associated with a particular oscillator (e.g., a modulating oscillator, sampling oscillator, and so on) is selected. The selection may be made from a lookup table, database, or other memory structure configured to store one or more phase noise profiles. In some cases, a phase noise profile may be stored as a vector of individual values, each of which is associated with a particular frequency or narrow band of frequencies. In other cases, a table, graph, or manufacturers specification document can be used to obtain a phase noise profile.

In some cases, a phase noise profile may be measured in real time. For example, an oscillator can be compared to a known reference signal to determine phase shift, jitter, or phase shift over a given period of time. For example, both a reference signal and an output of an oscillator under tests can be provided as input to a phase lock loop. Output of the phase lock look over time can be used to determine variance in phase over time. In other cases, other methods of calculating or determining a phase noise characteristic of a particular oscillator may be used.

Next at operation 204, the phase noise profile may used to determine expected phase noise within a particular band of frequencies, which may include the frequencies at which the oscillator is expected to be operated.

Finally, at operation 206, one or more operational characteristics of the communications device may be modified based on the expected phase noise of the oscillator determined at operations 202 and 204. For example, an operational parameter of a self-interference cancellation subsystem (SIC) may be set based on a calculated floor of self-interference possible given the particular phase noise profile (see, e.g., Eq. 1-4). In other cases, an operational parameter of a transmitter subsystem or receiver subsystem may be set, such as a maximum transmit power, an encoding used to transmit information, a particular beam index of a given beamformed transmit array, and so on.

Figure 3:
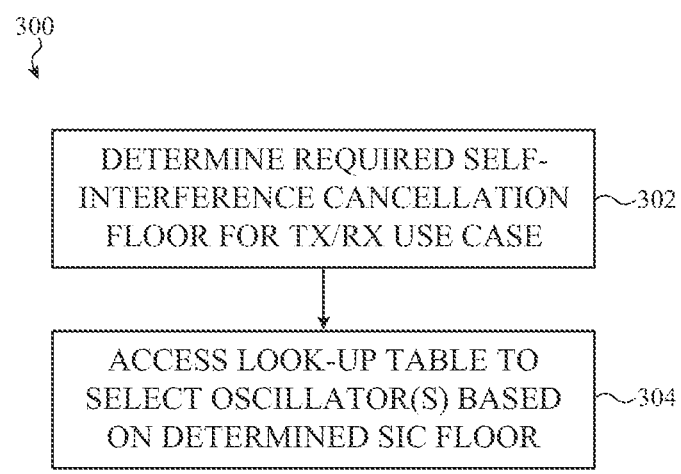
FIG. 3 is a flowchart depicting example operations of another method of operating a communications device incorporating a self-interference cancellation subsystem, such as described herein.

FIG. 3 is a flowchart depicting example operations of another method of operating a communications device incorporating a self-interference cancellation subsystem, such as described herein.

As with previous methods, the method 300 can be performed by any suitable virtual or physical hardware; this description is not repeated.

The method 300 can include operation 302 at which a minimum quantity of self-interference cancellation required for a particular wireless communication use case (e.g., within a particular deployment or environment) may be determined. For example, it may be determined that for a particular deployment, transmit power must be at least a particular value. At this value, self-interference received by the receiver may require at least a threshold value of cancellation to be effectively mitigated. In other cases, a received signal may be particularly low power and may require significant self-interference cancellation regardless of transmit power.

In such embodiments, the method 300 can also include operation 304 at which a lookup table or other database structure can be accessed to determine which oscillator among a set of oscillators may be suitable to include in the communications device based on the required minimum threshold of self-interference cancellation. Thereafter, once an oscillator is selected, the oscillator can be enabled and/or otherwise installed into the communications device.

It may be appreciated that although a lookup table and/or a database structure storing information related to self-interference and/or phase noise profiles of one or more oscillators, it may be appreciated that this is merely one example. For instance, in other embodiments, a wireless communications system can be designed for a particular installation/echo channel environment. In such examples, the time domain transfer function of the deployment may be used to inform a decision regarding what quality of oscillator to use for a particular oscillator internal to the wireless communication device or system. In other cases, a determination such as described above and elsewhere herein may be used to customize or modify a manufacturing operation of a particular wireless communication device; for example, during manufacture, a particular oscillator may be selected for a particular wireless communication device based on a minimum self-interference cancellation required of a particular deployment.

Figure 4:
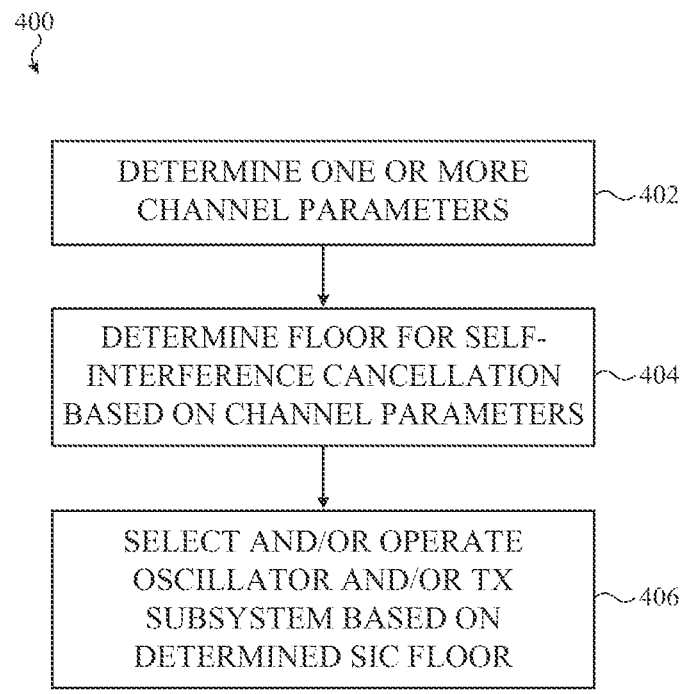
FIG. 4 is a flowchart depicting example operations of another method of operating a communications device incorporating a self-interference cancellation subsystem, such as described herein.

FIG. 4 is a flowchart depicting example operations of another method of operating a communications device incorporating a self-interference cancellation subsystem, such as described herein. As with preceding embodiments, the method 400 can be performed by any suitable physical or virtual hardware or software. In some cases, the method 400 can be performed by a controller or processor of a field-deployed wireless communication device, but this is not required of all embodiments.

The method 400 includes operation 402 at which one or more channel parameters of a particular deployment are determined. In some cases, a transfer function representing the channel can be measured, determined, or accessed from a lookup table or other memory structure.

Thereafter at operation 404, a floor (e.g., best-case scenario) for self-interference cancellation can be calculated given a particular set of oscillators and based on the particular channel parameters obtained at operation 402. Thereafter, at operation 406, one or more oscillators can be selected based on the required minimum self-interference cancellation. In other cases, or in addition, an operational parameter of a particular oscillator may be changed (e.g., increased filtering or increased power consumption to reduce phase noise exhibited by the oscillator's output).

These foregoing embodiments depicted in FIGS. 2-4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As noted above, a signal generator and/or photonic circuit or optical circuit such as described herein can be incorporated into any suitable computing device or computing resource. As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

What is claimed is:

1. A communication device comprising:
   a self-interference cancellation subsystem;
   a set of oscillators comprising at least two oscillators, each oscillator of the set of oscillators associated with a different respective phase noise profile; and
   a controller configured to:
   measure one or more self-interference channel parameters and one or more echo channel parameters;
   determine, based on the one or more self-interference parameters, for each respective phase noise profile and the one or more echo channel parameters, a respective value corresponding to maximum expected interference cancellation that can be provided by the self-interference cancellation subsystem when operably coupled to the respective oscillator associated with the respective phase noise profile; and
   dynamically select an oscillator to enable from the set of oscillators based at least in part on a determination that the respective determined value minimizes power consumption of the self-interference cancellation subsystem.

2. The communications device of claim 1, wherein the oscillator to enable comprises a modulating oscillator of a transmitter subsystem of the communication device.

3. The communications device of claim 1, wherein the oscillator to enable comprises a sampling oscillator of a receiver subsystem of the communication device.

4. A method comprising:
   selecting a transfer function representing an environment in which an electronic transceiver device may be deployed by measuring at least one echo channel parameter by the electronic transceiver device;

selecting an oscillator from a set of oscillators, the set of oscillators comprising at least two oscillators;

determining a phase noise profile of the selected oscillator;

determine, from the phase noise profile and the transfer function, a maximum expected self-interference cancellation that can be provided by a self-interference cancellation system using the oscillator; and determining whether the maximum expected self-interference satisfies a target value while minimizing power consumption of the self-interference cancellation system and, in response, selecting the oscillator for field use by the electronic transceiver device.

5. The method of claim 4, wherein the oscillator is a sampling oscillator configured for use by a receiver subsystem of the electronic transceiver device.

6. The method of claim 4, wherein the oscillator is a modulating oscillator configured for use by a transmitter subsystem of the electronic transceiver device.

7. The method of claim 4, wherein the target value is based, at least in part, on power consumption of the self-interference cancellation system when using with the oscillator.

8. The method of claim 4, wherein the target value is based, at least in part, on a symbol rate of a transmitter subsystem of the electronic transceiver device.

9. The method of claim 4, wherein the target value is based, at least in part, on a transmit power of a transmitter subsystem of the electronic transceiver device.

10. The method of claim 4, wherein the target value is based, at least in part, on a target symbol rate of a receiver subsystem of the electronic transceiver device.

11. The method of claim 4, wherein determining the phase noise profile of the selected oscillator comprises accessing a lookup table storing one or more phase noise profiles associated with the set of oscillators.

* * * * *